(12) United States Patent
Sumi

(10) Patent No.: US 12,067,317 B2
(45) Date of Patent: Aug. 20, 2024

(54) INFORMATION PROCESSING APPARATUS HAVING CHAT FUNCTION, INFORMATION PROCESSING SYSTEM, CONTROL METHODS THEREFOR, AND STORAGE MEDIA STORING CONTROL PROGRAMS THEREFOR

(71) Applicant: CANON KABUSHIKI KAISHA, Tokyo (JP)

(72) Inventor: Taiki Sumi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/363,212

(22) Filed: Aug. 1, 2023

(65) Prior Publication Data

US 2024/0069832 A1 Feb. 29, 2024

(30) Foreign Application Priority Data

Aug. 23, 2022 (JP) .................. 2022-132615

(51) Int. Cl.
*G06F 3/12* (2006.01)
*H04N 1/00* (2006.01)

(52) U.S. Cl.
CPC .......... *G06F 3/1257* (2013.01); *G06F 3/1204* (2013.01); *H04N 1/00482* (2013.01); *G06F 3/1288* (2013.01)

(58) Field of Classification Search
None
See application file for complete search history.

(56) References Cited

U.S. PATENT DOCUMENTS

2012/0105918 A1* 5/2012 Fan .................... G06V 30/1463
358/448
2015/0193241 A1* 7/2015 Hamzata ................. G06F 9/541
719/320

FOREIGN PATENT DOCUMENTS

JP 2020047000 A 3/2020

* cited by examiner

*Primary Examiner* — Darryl V Dottin
(74) *Attorney, Agent, or Firm* — ROSSI, KIMMS & McDOWELL LLP

(57) ABSTRACT

An information processing apparatus that can reduce a trouble of confirming a job setting by a proxy executor. The information processing apparatus displays a first screen used for a chat between a requester and the proxy executor, displays a second screen for setting a job for an image forming apparatus in performing a first operation during display of the first screen, and transmits information indicating a setting performed on the second screen to an external server to generate a setting information package of the job set on the second screen in performing a second operation during display of the second screen. The proxy executor is set by an operation on the second screen. A notification showing that the proxy execution becomes possible is transmitted from the external server to the proxy executor when information indicating the setting on the second screen includes information indicating that the proxy executor is set.

17 Claims, 17 Drawing Sheets

*FIG. 11*

| | Generation of work flow ticket | | |
|---|---|---|---|
| | Job name | Advanced settings (1106) | |
| 1101 | Scan of application document | Destination | Yamada.taro@mail.xxx |
| | Job content | Reading size | A4 |
| 1102 | Please scan the application document on the desk | Resolution | 300 x 300 dpi |
| | Deadline | File format | PDF |
| 1103 | 2022/XX/YY | Magnification | 110% |
| | Job type | Single side/Double side | Double side |
| 1104 | Scan and send mail | Color | Auto |
| | Request destination | File name | Application_document.pdf |
| 1105 | XX department YY section sumi.taiki | | |
| | | | Generate (1107) |

1300 — Generation of work flow ticket

Job name: Print and scan of application document

Job content (1302): Please print application document, press stamp of manager, and scan Deadline: 2022/XX/YY Job type: Print

1301 — ⊕

Request destination: XX department YY section sumi.taiki

Advanced settings:
- Number of copies: 1
- N in 1: 1 in 1
- Staple: Yes
- Single side/Double side: Double side
- Color: Auto
- File name: filled-out_application_document.pdf

[Generate]

FIG. 13B

1310 — Generation of work flow ticket

Job name: Print and scan of application document

Job content: Please print application document, press stamp of manager, and scan Deadline: 2022/XX/YY Job type:
- 1311 — Print
- 1312 — Scan and send mail
- ⊕

Request destination: XX department YY section sumi.taiki

Advanced settings:
- Destination: Yamada.taro@mail.xxx
- Reading size: A4
- Resolution: 300 x 300 dpi
- File format: PDF
- Magnification: 100%
- Single side/Double side: Double side
- Color: Auto
- File name: application_document.pdf

[Generate]

FIG. 15A

| Job management server cooperation application | | | | |
|---|---|---|---|---|
| Job name | Job type | Requester | Print data name/Destination | |
| Print and scan of application document_1 | Print | Yamada | filled-out_application_document.pdf | ✕ |
| Print of bill | Print | Sasaki | bill.pdf | ✕ |
| Share of symposium material | Scan and send mail | Personal | Sumi.taiki@mail.xxx | ✕ |

FIG. 15B

Job management server cooperation application — 1510

| Job name | Job type | Requester | Print data name/Destination | |
|---|---|---|---|---|
| Print and scan of application document_2 | Scan and send mail | Yamada | application_document.pdf | ✕ |
| Print of bill | Print | Sasaki | bill.pdf | ✕ |
| Share of symposium material | Scan and send mail | Personal | Sumi.taiki@mail.xxx | ✕ |

| Job management server cooperation application | | | |
|---|---|---|---|
| Job name | | | |
| Scan of application | | | |
| Print of bill | | | |
| Share of symposium material | | | |

Job is executed with the following settings.

| | | |
|---|---|---|
| Destination | Yamada.taro@mail.xxx | |
| Reading size | A4 | |
| Resolution | 300 × 300 dpi | |
| File format | PDF | |
| Magnification | 100% | |
| Single side/Double side | Double side | |
| Color | Auto | |
| File name | Application_document.pdf | |

Cancel    OK 1520, 1521, 1522 ized description # INFORMATION PROCESSING APPARATUS HAVING CHAT FUNCTION, INFORMATION PROCESSING SYSTEM, CONTROL METHODS THEREFOR, AND STORAGE MEDIA STORING CONTROL PROGRAMS THEREFOR

BACKGROUND OF THE INVENTION

Field of the Invention

The present invention relates to an information processing apparatus having a chat function, an information processing system, control methods therefor, and storage media storing control programs therefor.

Description of the Related Art

There is a conventional collaboration application having a chat function that enables communication between users at different locations. Moreover, there is an information processing system in which a print job can be directly input from a collaboration application to an MFP (see, for example, Japanese Laid-Open Patent Publication (Kokai) No. 2020-47000 (JP 2020-47000A)).

However, the information processing system of the above publication can be used only when a user who uses the collaboration application prints in person. For this reason, there is a problem that a user during hybrid work or homework cannot use even when the user requests a member in an office to execute a job on behalf of the user.

In the meantime, there is a case where the user informs a member who is a proxy executor about a desired job setting using a chat function of the collaboration application so that the proxy executor will perform the job setting on the MFP and execute the job. However, in this case, there is a problem in that the job is executed with an erroneous setting when the job setting is not accurately transmitted from the user as a requester to the proxy executor.

SUMMARY OF THE INVENTION

The present invention provides an information processing apparatus, an information processing system, control methods therefor, and storage media storing control programs therefor, which can reduce a trouble of confirming a job setting by a proxy executor who is requested to execute a job of an image forming apparatus on behalf by a requester using a chat function.

Accordingly, an aspect of the present invention provides an information processing apparatus included in an information processing system that further includes an image forming apparatus and an external server and enables proxy execution of a job to the image forming apparatus by a proxy executor based on a request from a requester, the information processing apparatus including at least one memory and at least one processor and/or at least one circuit that function as: a first display control unit configured to perform control to display a first screen used for a chat between the requester and the proxy executor, a second display control unit configured to perform control to display a second screen for setting a job for the image forming apparatus in a case where the requester performs a first operation during display of the first screen, and a transmission control unit configured to transmit information indicating a setting performed on the second screen to the external server to control the external server to generate a setting information package of the job set on the second screen in a case where the requester performs a second operation during display of the second screen. The proxy executor can be set based on an operation performed on the second screen. A notification showing that the proxy execution of the job using the setting information package becomes possible is transmitted from the external server to the proxy executor in a case where information indicating the setting performed on the second screen includes information indicating that the proxy executor is set.

According to the present invention, it is possible to reduce a trouble of confirming the job setting by the proxy executor who is requested to execute the job of the image forming apparatus on behalf by the requester using the chat function.

Further features of the present invention will become apparent from the following description of exemplary embodiments with reference to the attached drawings.

BRIEF DESCRIPTION OF THE DRAWINGS

FIG. 11 is a view showing a job setting screen displayed on the display unit of the information processing apparatus according to the first embodiment.

FIG. 13A and FIG. 13B are views showing job setting screens displayed on the display unit of the information processing apparatus according to a second embodiment.

FIG. 15A, FIG. 15B, and FIG. 15C are views showing job list screens displayed on the operation panel of the MFP according to the second embodiment.

DESCRIPTION OF THE EMBODIMENTS

Figure 1:
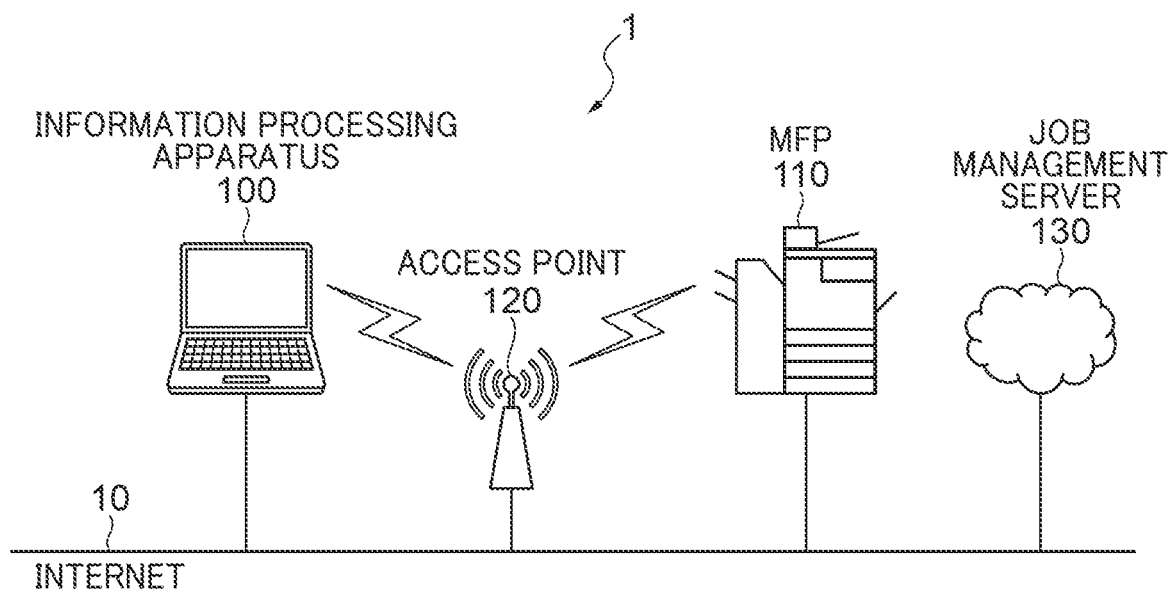
FIG. 1 is a view showing a configuration of an information processing system according to a first embodiment.

Hereafter, embodiments according to the present invention will be described in detail by referring to the drawings. It should be noted that the following embodiments are not intended to limit the invention according to the claims, and all combinations of features described in the embodiments are not necessarily essential to the solution of the invention.

First, a configuration of an information processing system 1 according to this embodiment will be described with reference to FIG. 1.

The information processing system 1 includes an information processing apparatus 100, an MFP 110, and a job management server 130. The information processing apparatus 100, MFP 110, and job management server 130 communicate via the Internet 10. The information processing apparatus 100 and the MFP 110 may be wirelessly connected to the Internet 10 via an access point 120.

A hardware configuration of the information processing apparatus 100 will now be described with reference to FIG. 2. It should be noted that the information processing apparatus 100 in this embodiment shall be a device, such as a PC, a smartphone, or a tablet, but may be another device as long as it is an information processing apparatus communicable with the Internet 10.

Figure 2:
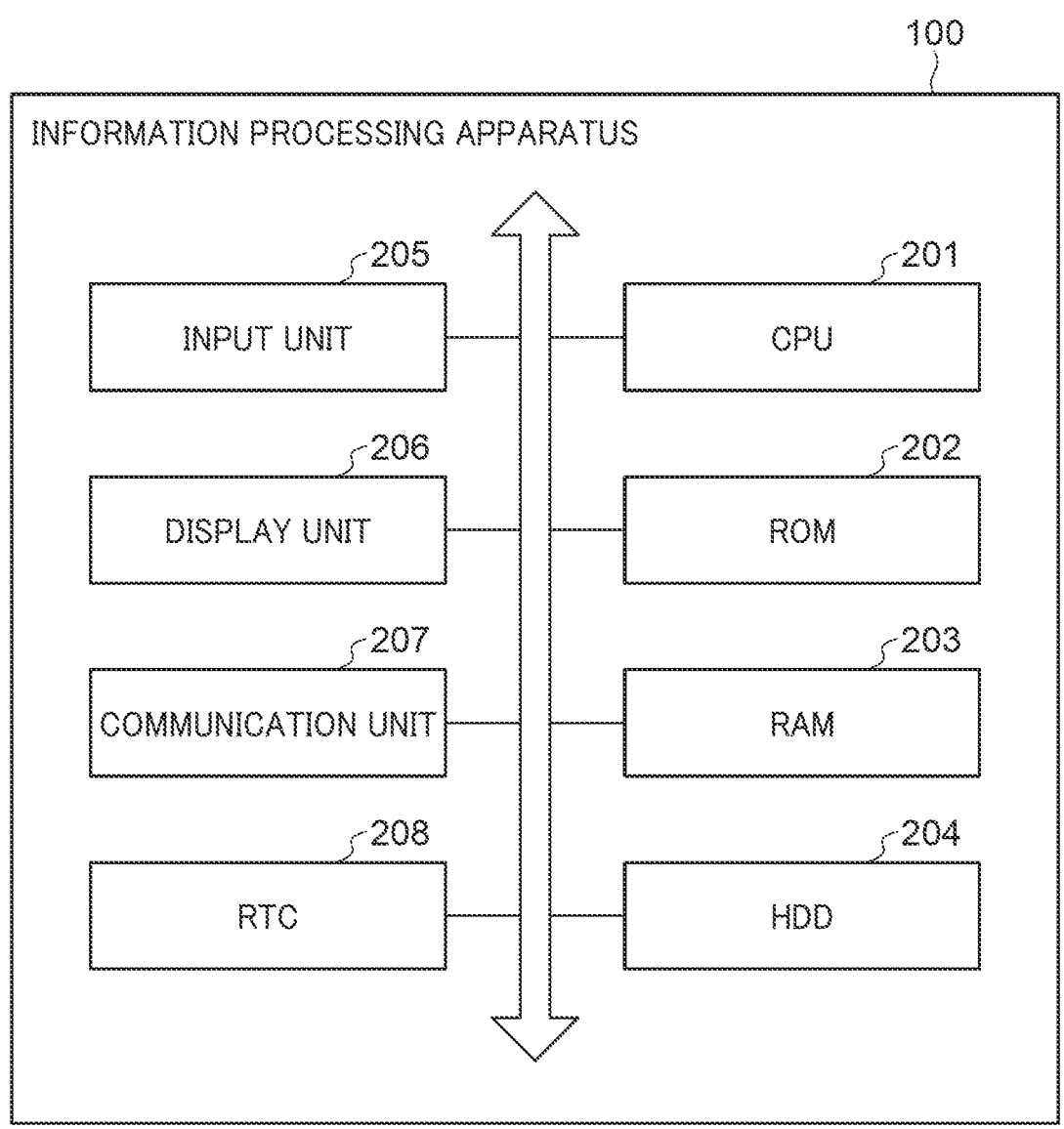
FIG. 2 is a block diagram showing a hardware configuration of an information processing apparatus in FIG. 1.

As shown in FIG. 2, the information processing apparatus 100 includes a CPU 201, a ROM 202, a RAM 203, an HDD 204, an input unit 205, a display unit 206, a communication unit 207, and an RTC 208.

The CPU 201 reads a control program stored in the ROM 202 and executes various processes for controlling operations of the information processing apparatus 100. The RAM 203 is used as a main memory of the CPU 201 and a temporary storage area like a work area. The HDD 204 stores various data, such as photographs and electronic documents. An operating system (OS) 350 and a collaboration application 300, which will be described later, are also stored in the HDD 204.

Although the information processing apparatus 100 is configured so that the single CPU 201 will execute processes shown in flowcharts described below, another configuration may be also employed. For example, a plurality of CPUs may cooperate with each other to execute the processes shown in the flowcharts described below.

The input unit 205 accepts input to the information processing apparatus 100. This input may be input to an external terminal or may be input to a device attached to the information processing apparatus 100 such as a device having a touch panel function.

The display unit 206 displays various screens provided by the OS 350 and the collaboration application 300. The display unit 206 may have a touch panel function capable of detecting a touch operation by a user. The communication unit 207 executes long-distance communication using the Internet 10. The RTC 208 is a real time clock and measures time.

Figure 3:
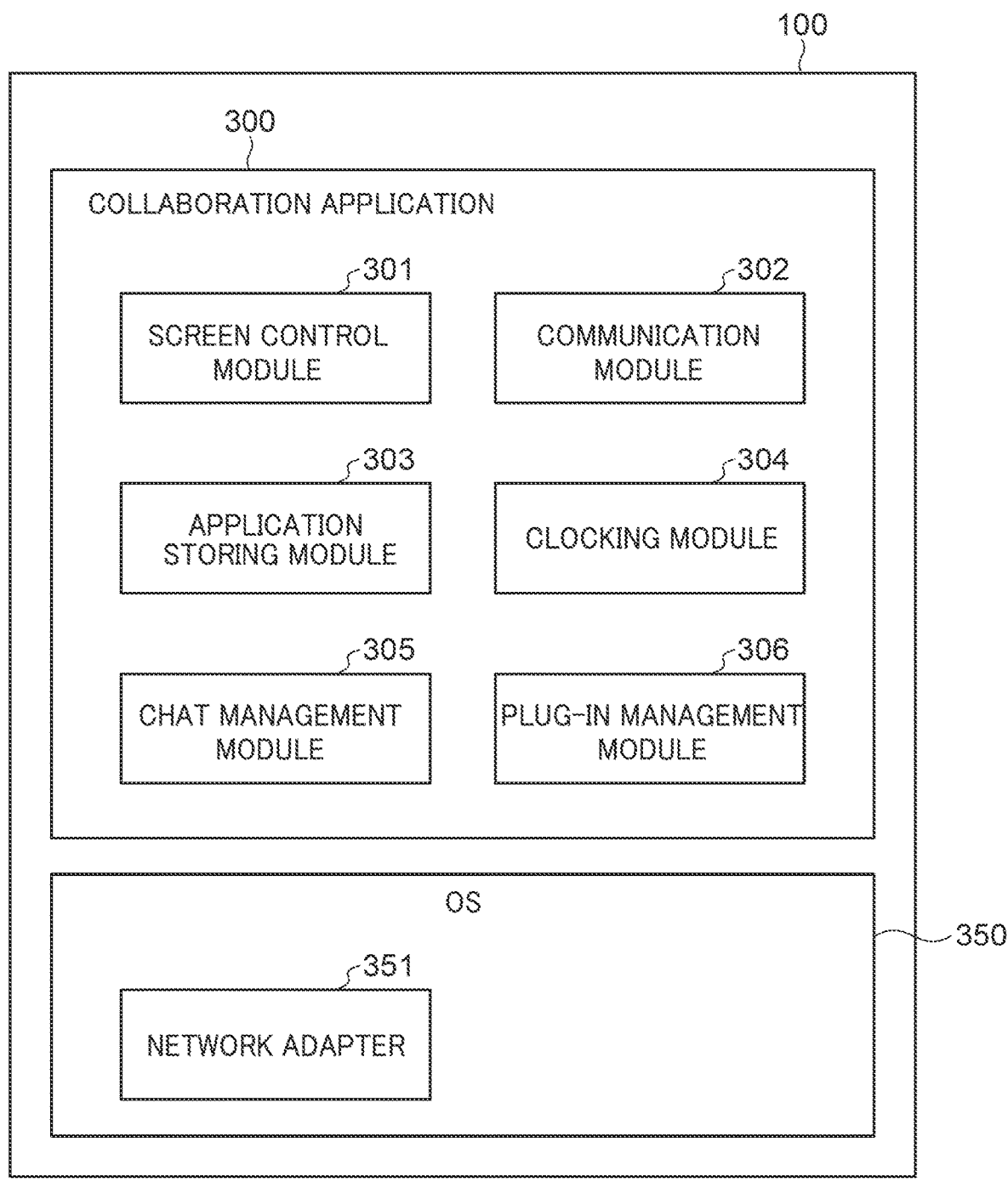
FIG. 3 is a block diagram showing a software configuration of the information processing apparatus.

The software configuration of the information processing apparatus 100 will now be described with reference to FIG. 3. FIG. 3 is a functional block diagram of software achieved by the CPU 201 reading a control program stored in the ROM 202 or the collaboration application 300 stored in the HDD 204.

The OS 350 is software running on the information processing apparatus 100. Various applications including the collaboration application 300 described below can be installed in the information processing apparatus 100. The OS 350 exchanges information with these applications, and changes a screen displayed on the display unit 206 in accordance with an instruction received from an application. In addition, the OS 350 includes a device driver group for controlling various types of hardware units, and provides APIs for using various types of hardware units to the applications running on the OS 350.

Figure 10A:
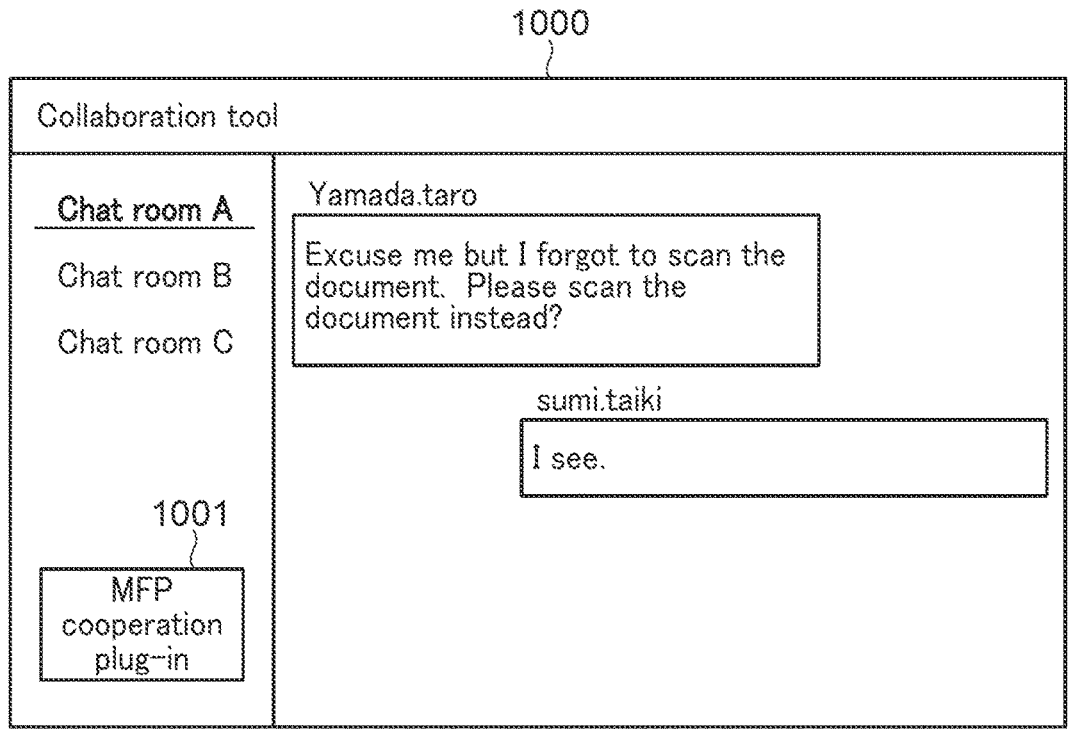
FIG. 10A and FIG. 10B are views showing a collaboration tool screen displayed on a display unit of the information processing apparatus according to the first embodiment.

The collaboration application 300 can be used in the information processing apparatus 100 and displays a collaboration tool screen 1000 (FIG. 10, a first screen) described later on the display unit 206 (a first display unit). A chat between members can be executed on the collaboration tool screen. Although various applications other than the collaboration application 300 can be used in the information processing apparatus 100, descriptions thereof will be omitted.

The software configuration of the collaboration application 300 will be described in further detail.

The collaboration application 300 includes a screen control module 301, a communication module 302, an application storing module 303, a clocking module 304, a chat management module 305, and a plug-in management module 306.

The screen control module 301 causes a UI screen for the collaboration application 300 to be displayed on the display 206. Further, the screen control module 301 determines an operation instruction input by the user through the input unit 205. The communication module 302 transmits and receives data using the communication unit 207 via the OS 350. The application storing module 303 temporarily stores various pieces of information. The clocking unit 304 clocks time using the RTC 208. The chat management module 305 manages posting and reception of a chat, and members participating in the chat via the communication module 302. The plug-in management module 306 performs functional cooperation with a plug-in for extending the function of the collaboration application 300, and displays a job setting screen 1100 (a second screen) described later transmitted from a job setting screen display module 703 described later on the display unit 206.

Figure 4:
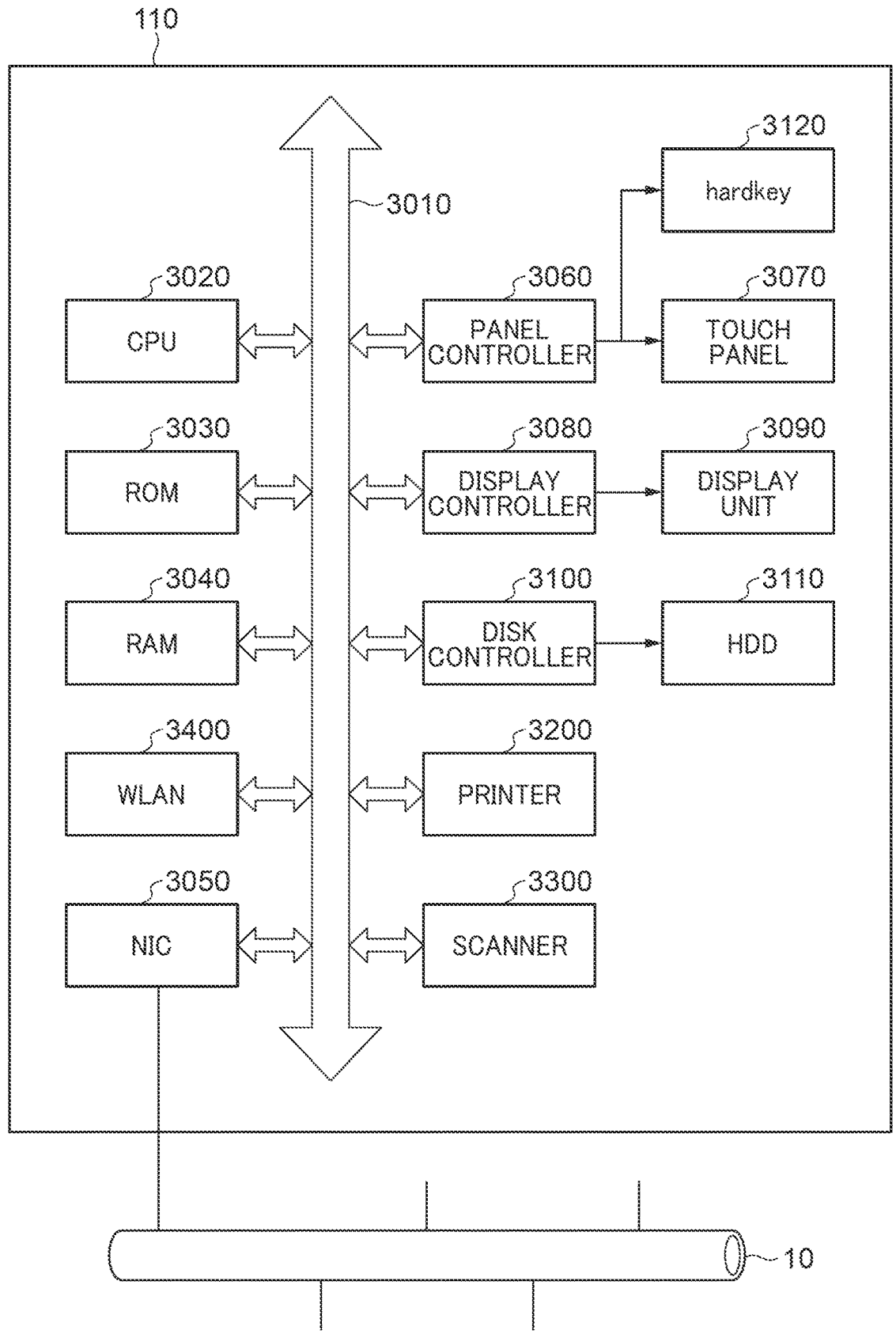
FIG. 4 is a block diagram showing a hardware configuration of an MFP in FIG. 1.

FIG. 4 is a block diagram showing a hardware configuration of the MFP 110.

As shown in FIG. 4, the MFP 110 includes a CPU 3020, a ROM 3030, a RAM 3040, an NIC 3050, a panel controller 3060, a touch panel 3070, a display controller 3080, and a display unit 3090. The MFP 110 further includes a disk controller 3100, an HDD 3110, a hardkey 3120, a printer 3200, and a scanner 3300. These devices are mutually connected via a system bus 3010.

The CPU 3020 executes software stored in the ROM 3030 or the HDD 3110, which is a mass storage device, and totally controls the devices connected to the system bus 3010.

The RAM 3040 functions as a main memory, a work area, etc. of the CPU 3020. The panel controller 3060 is an external input controller, and controls an instruction input from the hardkey 3120, which includes various hardware keys, or the touch panel 3070 that are provided on the MFP 110. In this embodiment, an operation unit of the MFP 110 is constituted by the hardkey 3120 and the touch panel 3070.

The display controller 3080 controls display of the display unit 3090 that is configured by a liquid crystal display or the like. The disk controller 3100 controls the HDD 3110.

The NIC 3050 is a network interface card that bidirectionally communicates with other network devices, file servers, or the like via the Internet 10. The printer 3200 is a printing unit that prints on paper realized by an electrophotographic method. The printing method is not particularly limited to the electrophotographic method.

The scanner 3300 is an image reading unit for reading an image printed on paper. In many cases, an ADF (Auto Document Feeder, not shown) is attached to the scanner 3300 as an option, and a plurality of documents can be automatically read. In some cases, the HDD 3110 is also used as a temporary image storage area.

Figure 5:
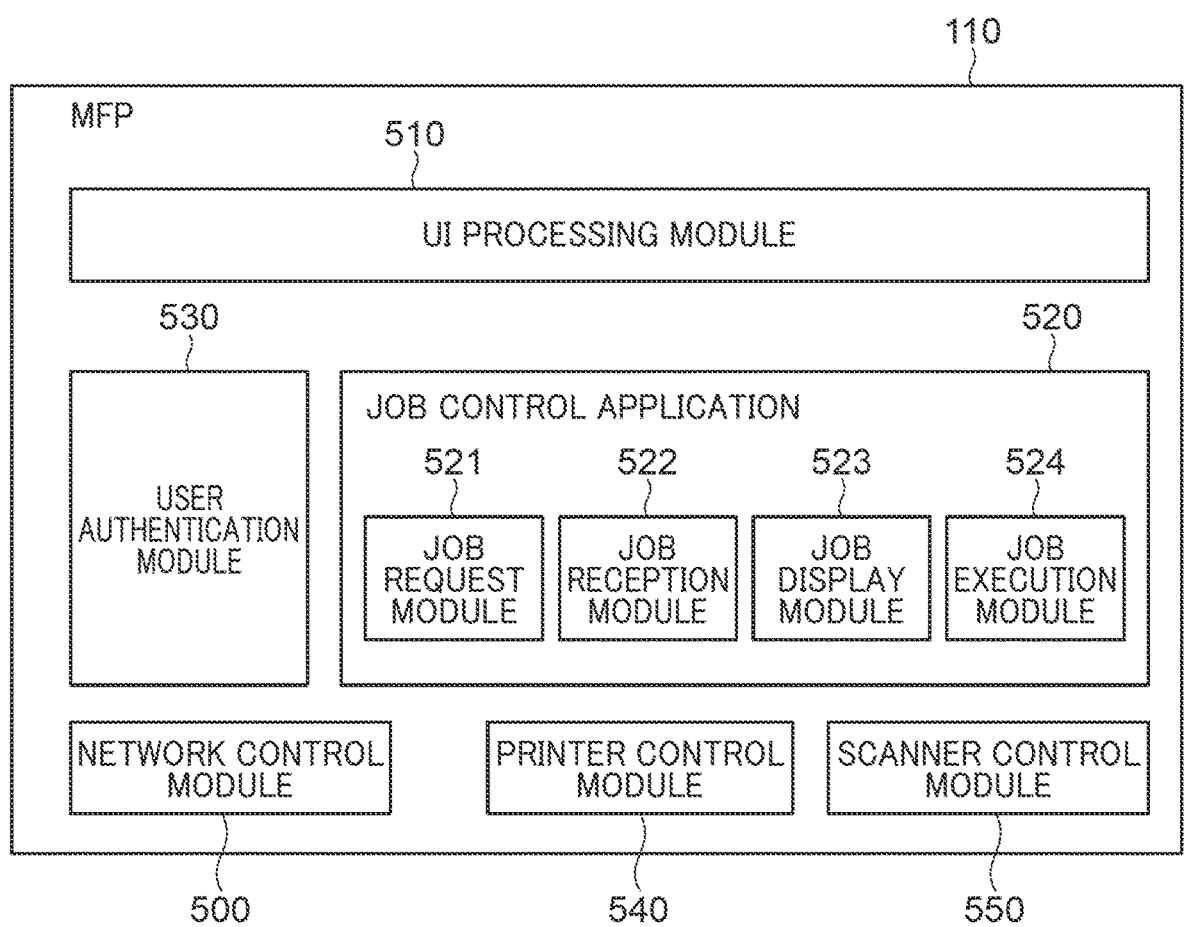
FIG. 5 is a block diagram showing a software configuration of the MFP.

FIG. 5 is a block diagram showing a software configuration of the MFP 110. The software is stored in the ROM 3030 and executed by the CPU 3020.

The MFP 110 includes a network control module 500, a UI processing module 510, a job control application 520, a user authentication module 530, a printer control module 540, and a scanner control module 550.

The UI processing unit 510 analyzes an input from an external input controller or job information received from a job reception module 522 described below and displays screen data generated by a job display module 523 described below on the display unit 3090 when a screen change is necessary. When there is a user input to the hardkey 3120 or the touch panel 3070, the UI processing unit 510 notifies a job execution module 524 described later of a content of the user input.

The job control application 520 includes a job request module 521, the job reception module 522, the job display module 523, and the job execution module 524. The job control application 520 is a software module for cooperating with the job management server 130.

The job request module 521 communicates with the job management server 130 using the network control module 500 to request a workflow ticket (a setting information package). The workflow ticket is data including a job setting value and may include information other than the job setting value.

The job reception module 522 receives the workflow ticket as a response of the job request module 521. The job display module 523 (a job display unit) displays the job information in the workflow ticket on the display unit 3090 by notifying the UI processing module 510 of the workflow ticket received by the job reception module 522. At this time, if there are a plurality of received workflow tickets, a plurality of pieces of job information may be displayed on the display unit 3090.

Upon receiving a notification, which shows that job information displayed by the job display module 523 is selected, from the UI processing module 510, the job execution module 524 analyzes the selected job information. After that, according to the analysis result, the job execution module 524 (a job execution unit) notifies the printer control module 540 that controls the printer 3200 and the scanner control module 550 that controls the scanner 3300 of the selected job information and executes the job. The network control module 500 is a module for controlling the NIC 3050.

Figure 6:
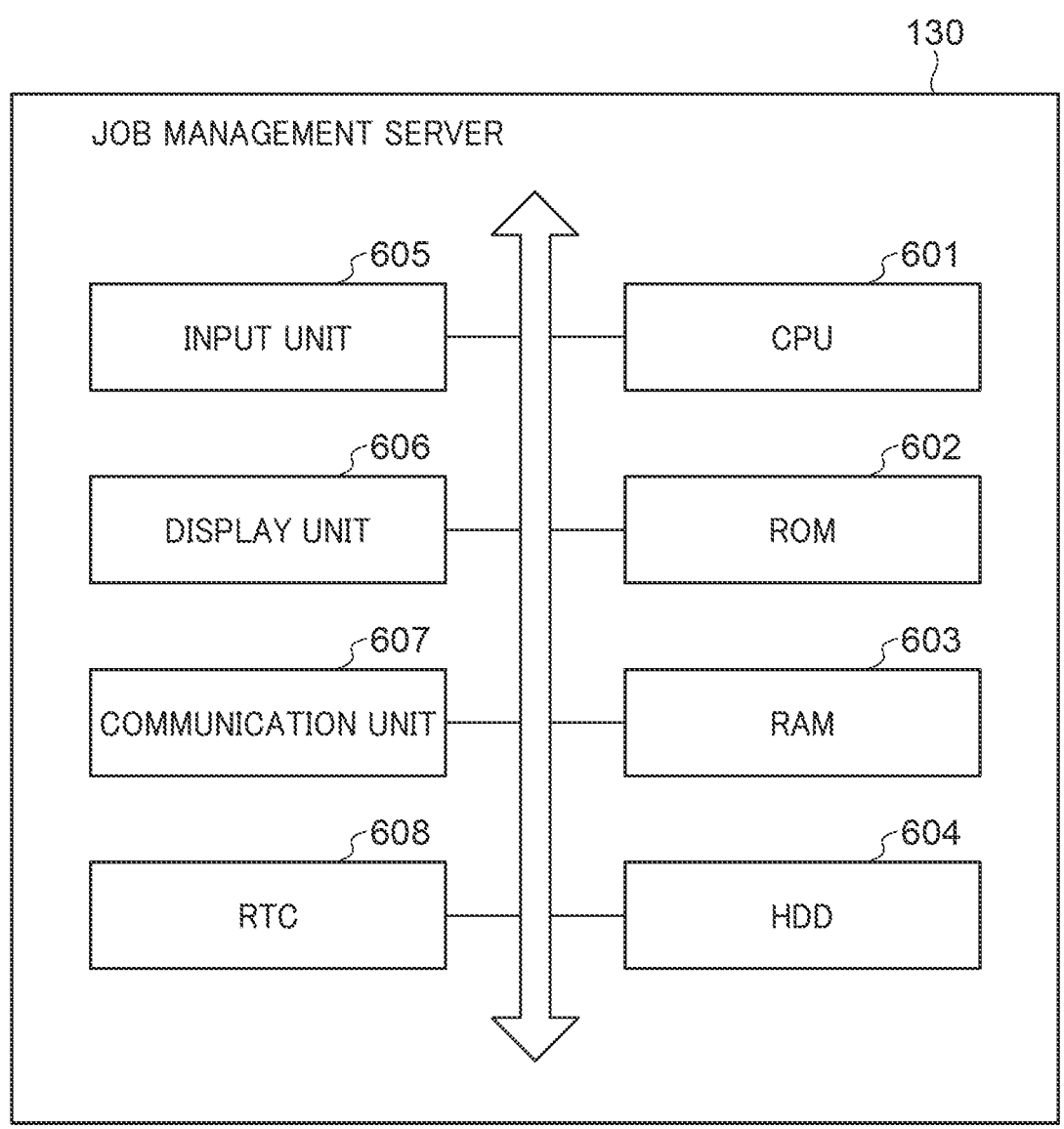
FIG. 6 is a block diagram showing a hardware configuration of a job management server in FIG. 1.

FIG. 6 is a block diagram showing a hardware configuration of the job management server 130. Since components in FIG. 6 are similar to those in FIG. 2, descriptions are omitted.

Figure 7:
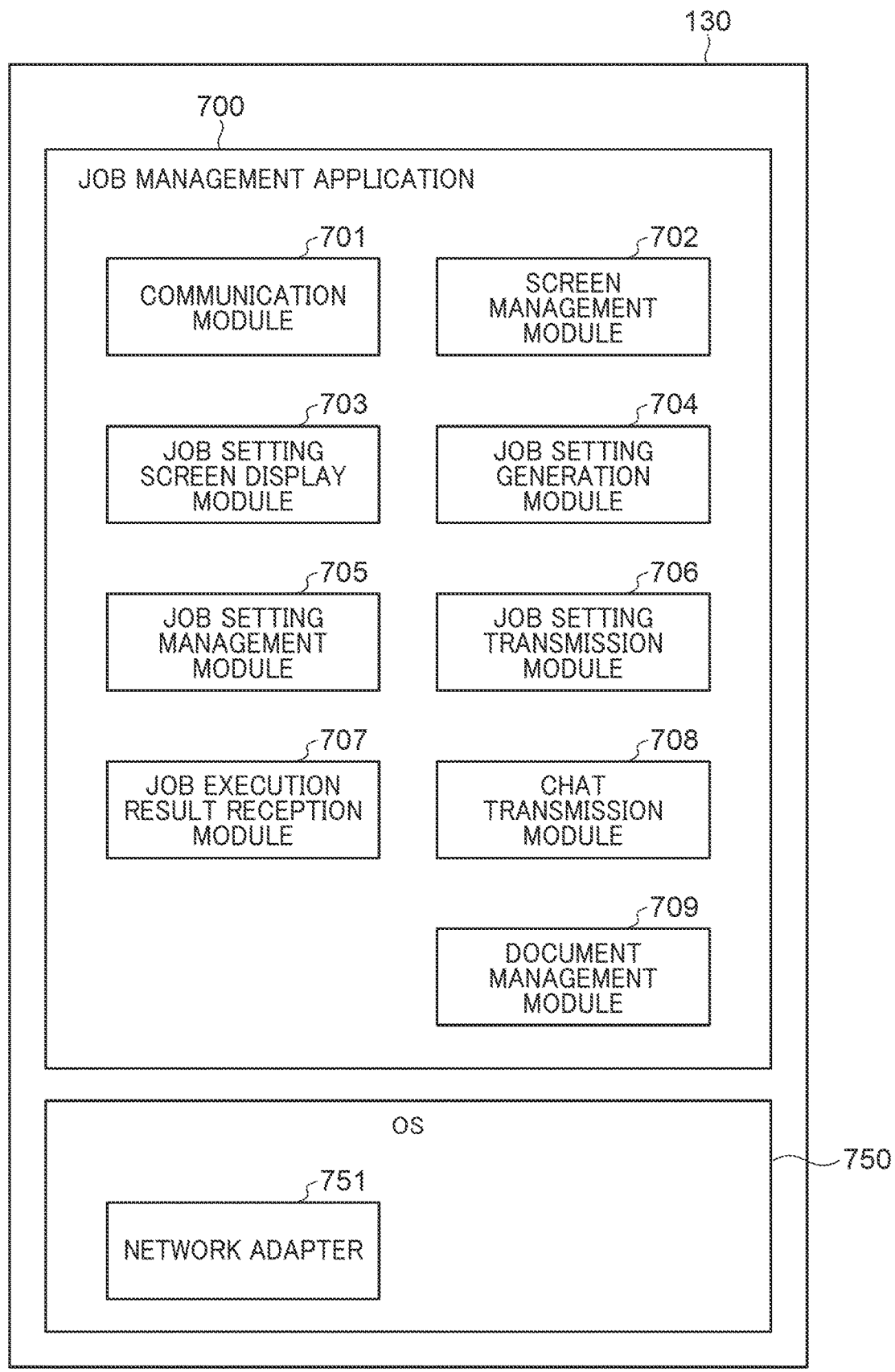
FIG. 7 is a block diagram showing a software configuration of the job management server.

A software configuration of the job management server 130 will now be described with reference to FIG. 7. The software is stored in a ROM 602 or an HDD 604 and executed by a CPU 601.

The job management server 130 includes a job management application 700 and an OS 750.

The job management application 700 is software running on the job management server 130 and can control a job through communication with the information processing apparatus 100 and communication with the MFP 110.

The software configuration of the job management application 700 will be described in further detail. The job management application 700 includes a communication module 701, a screen management module 702, a job setting screen display module 703, a job setting generation module 704, and a job setting management module 705. The job management application 700 further includes a job setting transmission module 706, a job execution result reception module 707, a chat transmission module 708, and a document management module 709.

The communication module 701 communicates with the information processing apparatus 100 and MFP 110 via a network adapter 751 included in the OS 750. The screen management module 702 manages screen information of the job setting screen 1100 (FIG. 11) displayed on the display unit 206 of the information processing apparatus 100.

When detecting a use request from the plug-in management module 306, the job setting screen display module 703 obtains the screen information from the screen management module 702 and sends it to the information processing apparatus 100 via the communication module 701 in order to display the job setting screen 1100 on the display 206.

The job setting generation module 704 (a generation unit) generates a workflow ticket for execution on the job execution module 524 in response to input to the job setting screen 1100. The job setting management module 705 (a management unit) manages and stores the workflow ticket generated by the job setting generation module 704.

The job setting transmission module 706, upon receiving a request for a workflow ticket from the job request module 521 via the communication module 701, retrieves the workflow ticket meeting a condition from the job setting management module 705 and sends it to the job reception module 522.

The job execution result reception module 707 receives the result of executing the job in the job execution module 524 and updates the information in the job setting management module 705 according to the received content. The chat transmission module 708 can send a chat to the chat management module 305. The document management module 709 can store a document as a scan result when the job execution module 524 performs scanning. The OS 750 and the network adapter 751 are respectively equivalent to the OS 350 and the network adapter 351, and descriptions thereof are omitted.

A process performed by the job management application 700 will now be described.

Figure 8:
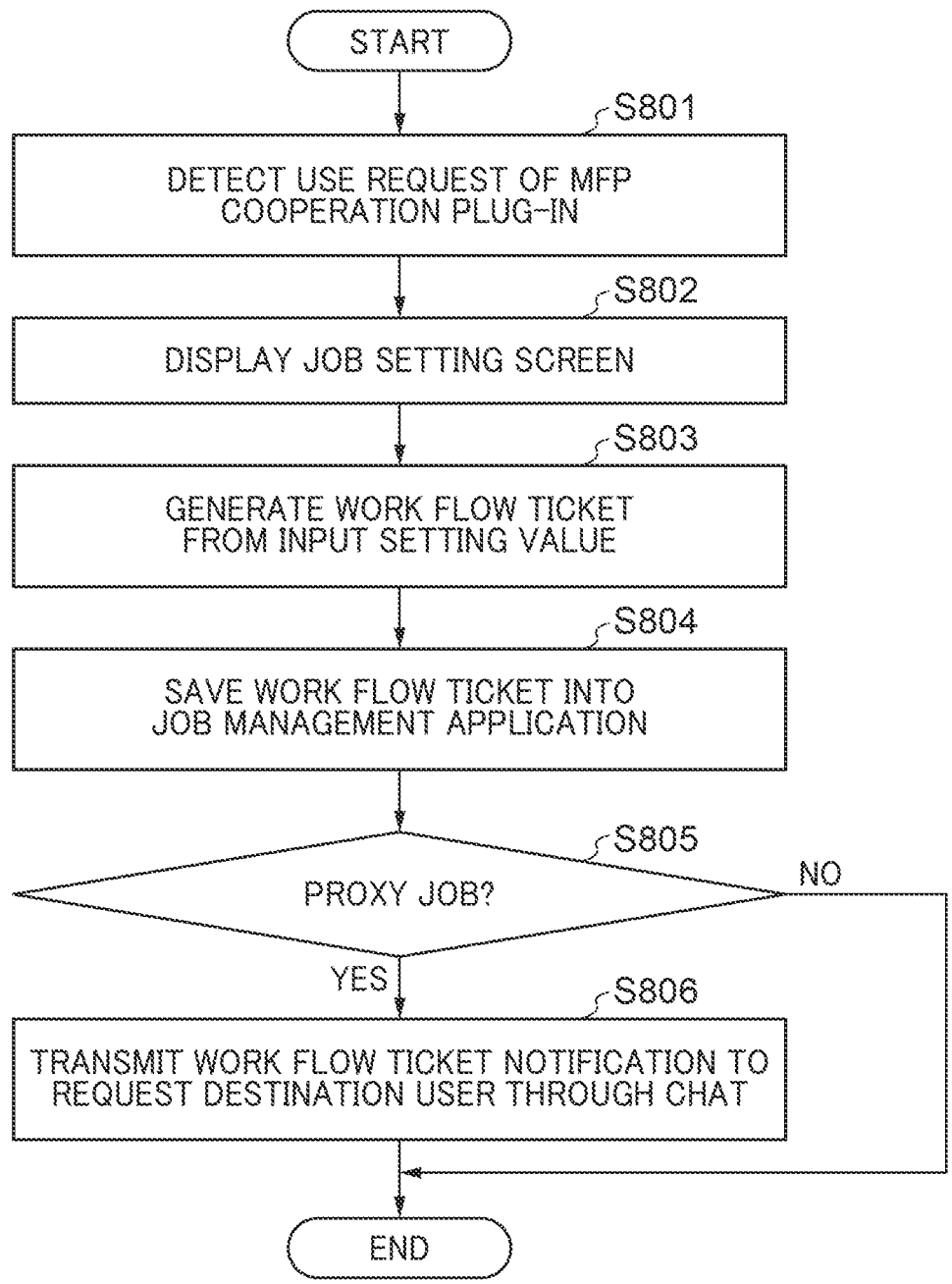
FIG. 8 is a flowchart showing a workflow ticket generation and transmission process according to the first embodiment.

FIG. 8 is a flowchart showing a workflow ticket generation and transmission process according to this embodiment.

This process starts in a state in which a connection between the information processing apparatus 100 and the job management server 130 has been established and the collaboration tool screen 1000 is displayed on the display unit 206 due to activation of the collaboration application 300 in the information processing apparatus 100. In addition, steps S801 to S806 shown in the flowchart in FIG. 8 are processed by the CPU 201 developing the control program and the collaboration application 300 stored in the memory like the ROM 202 to the RAM 203 and executing them.

Requestor information stored in the RAM 202 includes user information. The user information is set on a UI screen (not shown) before starting this process. The collaboration application 300 is connected to the job management application 700 via the plug-in management module 306.

When the CPU 201 detects that a button 1001 for activating the MFP cooperation plug-in is pressed (a first operation) in the collaboration tool screen 1000 (FIG. 10) displayed on the display unit 206 in the step S801, the process proceeds to the step S802.

In the step S802, the CPU 201 first uses the communication module 302 to obtain screen information for the job setting screen 1100 (FIG. 11) from the screen management module 702 of the job management server 130. Next, the CPU 201 uses the screen control module 301 to display the job setting screen 1100 on the display unit 206 (a second display unit). The screen information for the job setting screen 1100 (FIG. 11) may be stored in the application storing module 303 in advance, and the job setting screen 1100 may be displayed based on the screen information.

As shown in FIG. 11, a job name 1101, a job content 1102, a deadline 1103, a job type 1104, a request destination 1105, advanced settings 1106, and the like are displayed on the job setting screen 1100. As the job type 1104, "print", "scan and save in box", etc. can be selected in addition to "scan and send mail". The request destination 1105 (a proxy executor setting column) is set only when a user requests a proxy executor to execute a job, and may not be set when the user executes a job personally. Setting values used in executing a job can be set in the advanced settings 1106. When the request destination 1105 is set, the CPU 201 notifies the job management server 130 of the setting. Upon receiving the notification, the CPU 601 obtains the setting values from the image forming apparatus (the MFP 110 in this case) that can be used by the proxy executor, and updates the screen information of the job setting screen 1106 so that a setting unavailable in the MFP 110 will not be displayed on the advanced settings 1100. Thereafter, the CPU 601 transmits the updated screen information about the job setting screen 1100 to the information processing apparatus 100. The CPU 201 updates the display of the job setting screen 1100 based on the updated screen information about the job setting screen 1100 transmitted from the job management server 130.

When the CPU 201 detects that the user has set various setting values of the workflow ticket by input to the job setting screen 1100 and then pressed the button 1107 for generating the workflow ticket (a second operation), the process proceeds to a step S803. At this time, the CPU 201 transmits various setting values of the workflow ticket to the job management server 130 in association with the user information about the user who currently logs in to the information processing apparatus 100 using the communication module 207 or the communication module 302 (a transmission unit).

The CPU 601 generates the workflow ticket using the job setting generation module 704 based on the various settings set by the user using the job setting screen 1100 in the step S803, and proceeds with the process to a step S804.

In the step S804, the CPU 601 stores the workflow ticket generated in the step S803 into the job setting management module 705 for each user information. That is, the workflow ticket generated in the step S803 is stored in the job setting management module 705 in association with the user information about the user who executes the job.

In a step S805, the CPU 601 determines whether the workflow ticket generated in the step S803 is a proxy job. Here, if the request destination 1105 is set when the workflow ticket generation button 1107 is pressed in the step S803, it is determined to be the proxy job. When it is the proxy job (YES in the step S805), the process proceeds to a step S806. Otherwise, the process is terminated.

Figure 10B:
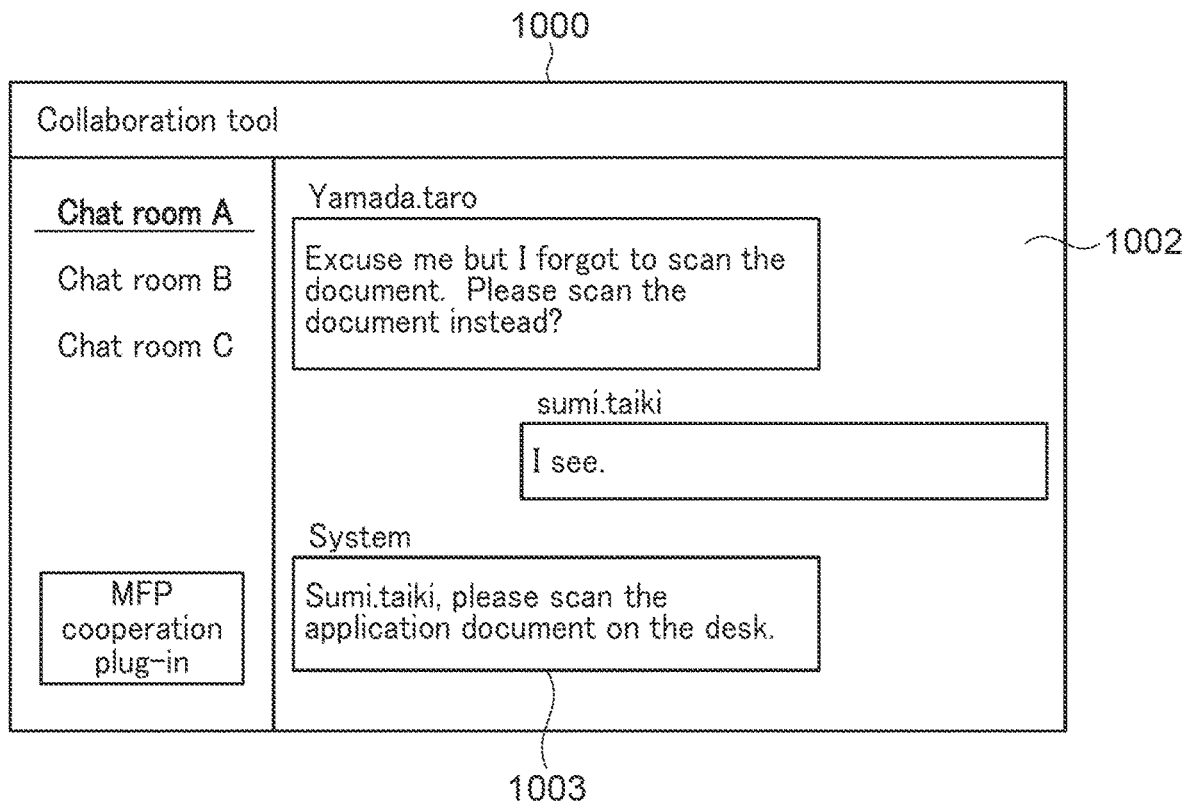

The CPU 601 sends a workflow ticket notification 1003 to the chat using chat transmission module 708 (notification sending means) to a request destination user of the proxy job in the step S806 and finishes the process. As a result, the workflow ticket notification 1003 from the information processing system 1 is displayed on the chat display section 1002 of the collaboration tool screen 1000 as shown in FIG. 10B. The workflow ticket notification 1003 is a notification indicating that the proxy executor can execute the proxy job in the S803 using the workflow ticket generated by the job management server 130 in the MFP 110.

In this embodiment, the CPU 601 transmits the workflow ticket notification 1003 to the request destination user of the proxy job by the chat. However, the present invention is not limited to such a configuration as long as the request destination user of the proxy job is notified of the workflow ticket notification 1003. For example, the workflow ticket notification 1003 may be displayed as a pop-up notification on a mobile terminal (not shown) held by the request destination user of the proxy job.

The request destination user having received this workflow ticket notification 1003 by the chat moves to the installation location of the MFP 110 and logs in to the MFP110 in order to execute the job content 1102. In response to the login, the CPU 3020 in the MF 110 accepts the execution of the proxy job by the request destination user and starts a process in FIG. 9.

Figure 9:
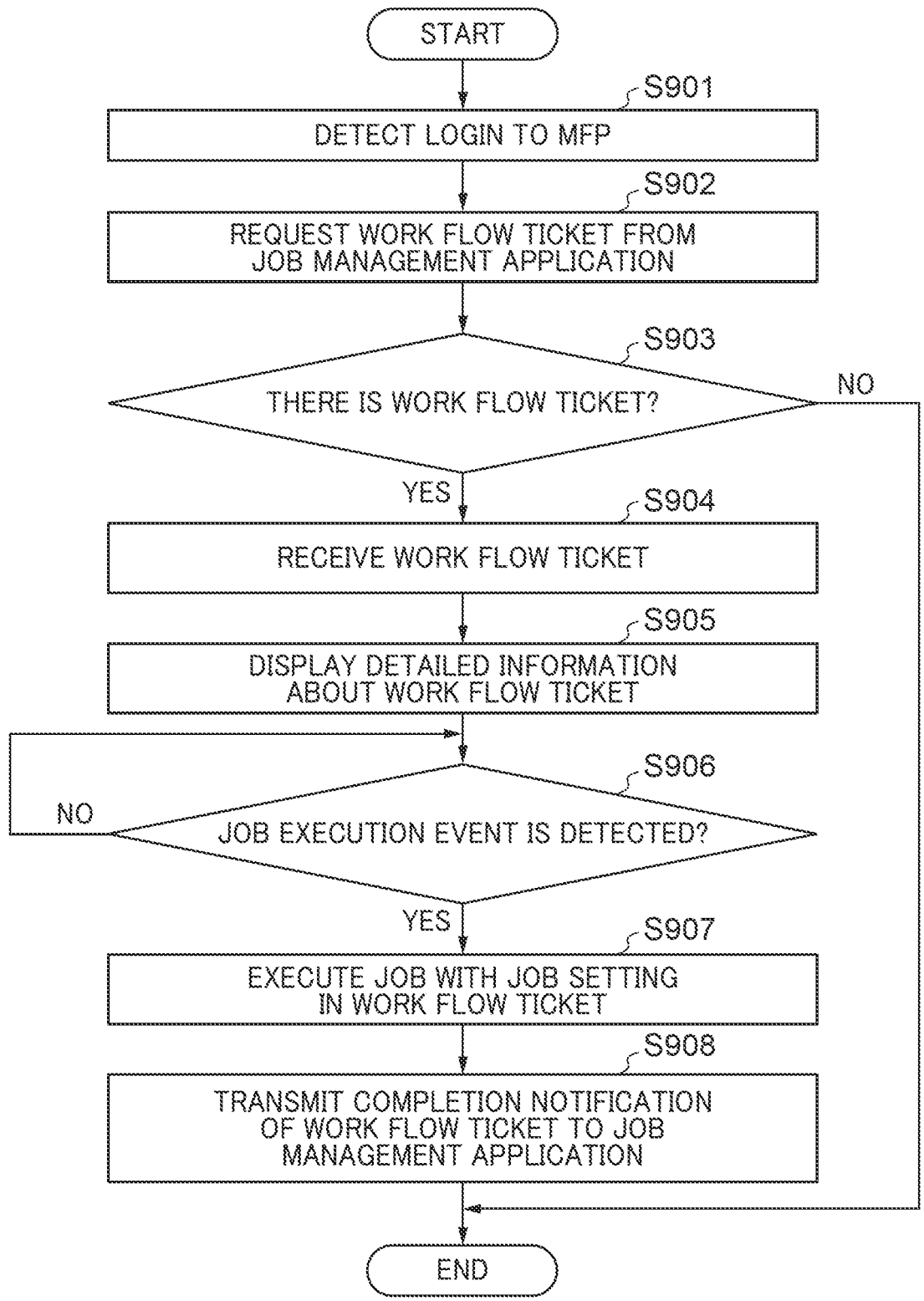
FIG. 9 is a flowchart showing a workflow ticket reception and execution process according to the first embodiment.

FIG. 9 is a flowchart showing a workflow ticket reception and execution process according to this embodiment.

In this process, the job control application 520 operating on the MFP 110 receives the workflow ticket from the job management application 700 operating on the job management server 130 and executes the job. In addition, each step shown in the flowchart in FIG. 9 is processed by the CPU 3020 of the MFP 110 developing the control program and the job control application 520 stored in the memory like the ROM 3030 to the RAM 3040 and executing them. It should be noted that a step S903 is processed by the CPU601 of the job management server 130 expanding the control program and the job management application 700 stored in the memory of the ROM603 or the like to the RAM603 and executing them.

When the CPU 3020 detects in a step S901 that a user logs in to the MFP 110 using the user authentication module 530, execution of the proxy job by the logged-in user (request destination user) is accepted and the process proceeds to a step S902.

In the step S902, the CPU 3020 activates the job control application 520 and requests a workflow ticket from the job management application 700. Specifically, the CPU 3020 obtains the user information from the login information input to the user authentication module 530 in the step S901 and transmits the user information to the job management server 130 at the same time as the request.

In the step S903, the CPU 601 determines whether there is a workflow ticket, which is associated with the user information transmitted in the step S902 and is not in a completion state, in the job setting management module 705 of the job management application 700. When it is determined that there is the workflow ticket (YES in the step S903), the job setting transmission module 706 transmits the corresponding workflow ticket to the MFP 110 as a response, and the process proceeds to a step S904. In the meantime, when it is determined that there is no such a workflow ticket (NO in the step S903), this process is terminated.

In the step S904, the CPU 3020 receives the workflow ticket transmitted as a response to the request in the step S902 with the job reception module 522. There may be a case where a plurality of workflow tickets are received in the step S904. Such a case will be described later in a second embodiment. A case where only one workflow ticket is received in the step S904 will be described in this embodiment.

Figure 12:
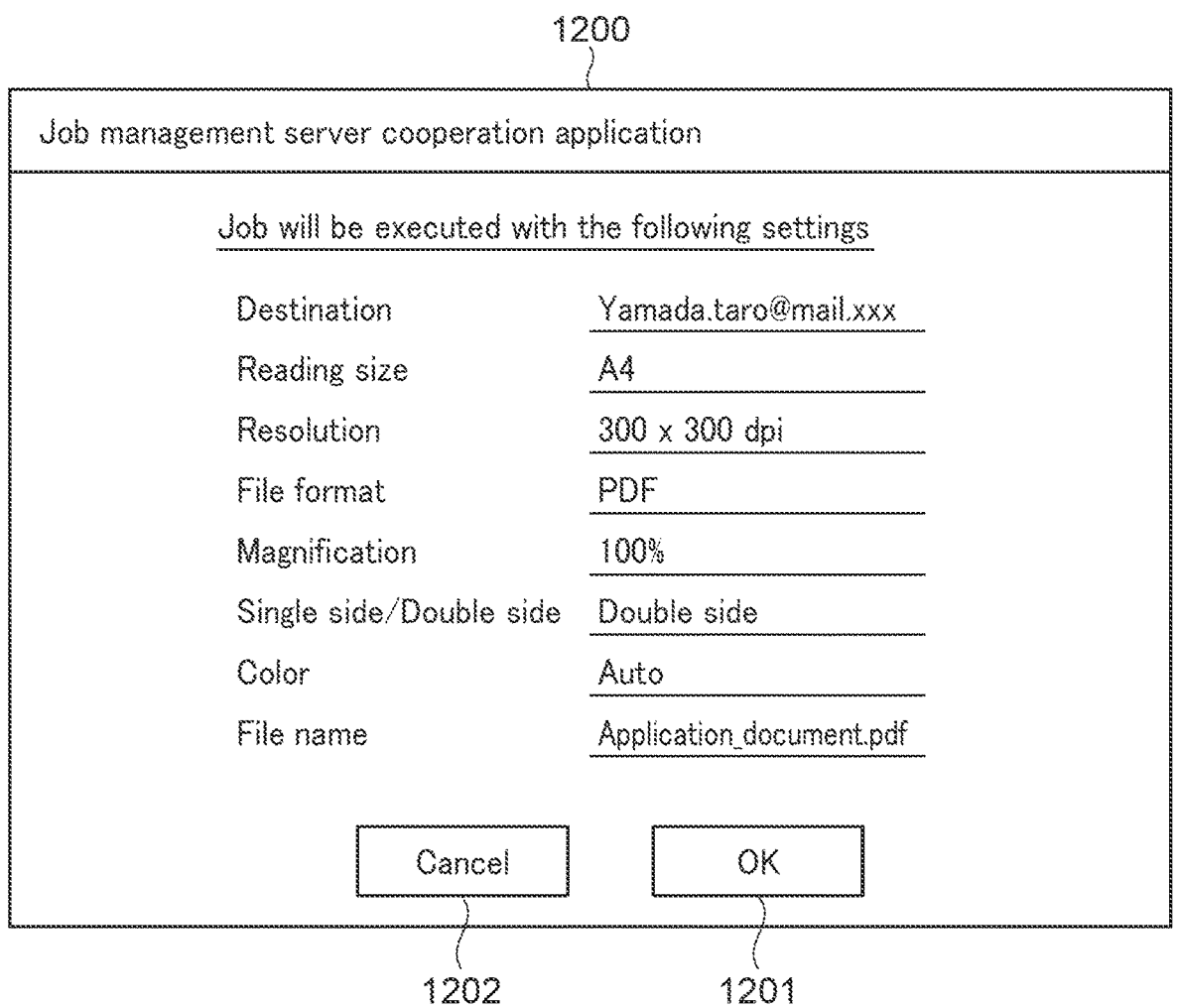
FIG. 12 is a view showing a job detail screen displayed on an operation panel of the MFP according to the first embodiment.

In a step S905, the CPU 3020 displays a job detail screen 1200 (FIG. 12) on the display unit 3090 by passing the job setting in the workflow ticket received in the step S904 to the job display module 523.

Detailed information about the job information of the workflow ticket received in the step S904 is displayed in the job detail screen 1200. Thereafter, when the CPU 3020 detects that a job execution start button 1201 (an instruction item) is pressed by a user (a job execution event) (YES in a step S906), the process proceeds to a step S907. It should be noted that the process may proceed to the step S907 not when the job execution start button 1201 is pressed but when the job detail screen 1200 is displayed. In this case, the job detail screen 1200 does not include the job execution start button 1201 but includes only a job cancel button 1202, and the display of this screen is also terminated at the time when this process is terminated by an execution completion notification in a step S908 described later. Further, the job detail screen 1200 may display "Job is executing with the following settings" instead of "Job will be executed with the following settings". If the job cancel button 1202 is pressed before the end of this process, an interrupt process for forcibly terminating this process is executed.

In the step S907, the CPU 3020 notifies the printer control module 540 controlling the printer 3200 and the scanner control module 550 controlling the scanner 3300 of the job settings in the workflow ticket to execute the job.

In the step S908, the CPU 3020 changes the state of the target workflow ticket managed by the job setting management module 705 to the completion state by using the job execution module 524 to send the target workflow ticket execution completion notification to the job management server 130. Thereafter, this process is terminated.

As described above, in this embodiment, the requester can perform the job setting when requesting another person (proxy executor) to execute a job in a chat by calling the job management application 700 from the collaboration application 300. This reduces a setting error when the proxy executor executes a job and the requester can obtain a desired result more easily. In addition, since the proxy executor does not need to be aware of the job settings, it is possible to reduce the time and effort for checking the settings.

Although the configuration in which the workflow ticket is transmitted from the job management server 130 to the MFP 110 has been described in this process, the present invention is not limited to such a configuration. For example, the job management server 130 may transmit the workflow ticket to the information processing apparatus 100 in transmitting the workflow ticket notification to the chat. In this case, the workflow ticket is transmitted from the information processing apparatus 100 to the MFP 110, and the MFP 110 displays the job detail screen 1200 based on the workflow ticket.

In the first embodiment, when the requester requests another person (proxy executor) to execute a job in a chat, the collaboration application 300 calls the job management application 700 to enable the requester to perform the job setting.

However, there may be a plurality of workflow tickets assigned to a user (proxy executor) in receiving the workflow ticket in the step S904. In this case, the CPU 3020 of the MFP 110 may be impossible to determine the workflow ticket to be displayed in the step S905 according to the method of the first embodiment.

In a second embodiment, a job list screen 1500 is displayed when a user to whom a plurality of workflow tickets are assigned uses the job control application 520 of the MFP 110.

In addition, according to the method of the first embodiment, it is impossible to generate a workflow ticket that combine a plurality of jobs, such as "print specific document, press stamp of manager, and scan". At this time, it is possible to create separate workflow tickets for the respective jobs to be combined. However, in this case, even when the printing of the specific document is not finished, the job detail screen 1200 of the workflow ticket that scans the specific document may be displayed as another workflow ticket. This may confuse the user (proxy executor).

The second embodiment enables generation of a workflow ticket to which a plurality jobs are registered.

Hereinafter, the second embodiment will be specifically described.

First, a process until the information processing apparatus 100 connects to the job management server 130 and transmits a workflow ticket to the job management application 700 in the second embodiment will be described. Since this process is the same as that in FIG. 8 except that a job setting screen 1300 shown in FIG. 13A is displayed in the step S802 instead of the job setting screen 1100, the job setting screen 1300 will be described and the description about the other steps are omitted.

When the user presses an add job button 1301 (FIG. 13A) on the job setting screen 1300 in setting various setting values of the workflow ticket using the CPU 3020 changes the screen to a job setting screen 1310 (FIG. 13B). Thus, a plurality of jobs can be registered in one workflow ticket. In this example, a print job and a scanner job corresponding to a message "Please print application document, press stamp of manager, and scan" described in a job content 1302 (FIG. 13A) are registered in one workflow ticket. Therefore, in this embodiment, the workflow ticket notification including the message "Please print application document, press stamp of manager, and scan" described in the job content 1302 (FIG. 13A) is transmitted to the request destination user through the chat.

The request destination user who receives this workflow ticket notification through the chat moves to the installation location of the MFP 110 and logs in to the MFP 110 in order to execute the job content 1302. In response to the login, the CPU 3020 in the MF 110 accepts the execution of the proxy job by the request destination user and starts a process in FIG. 14.

Figure 14:
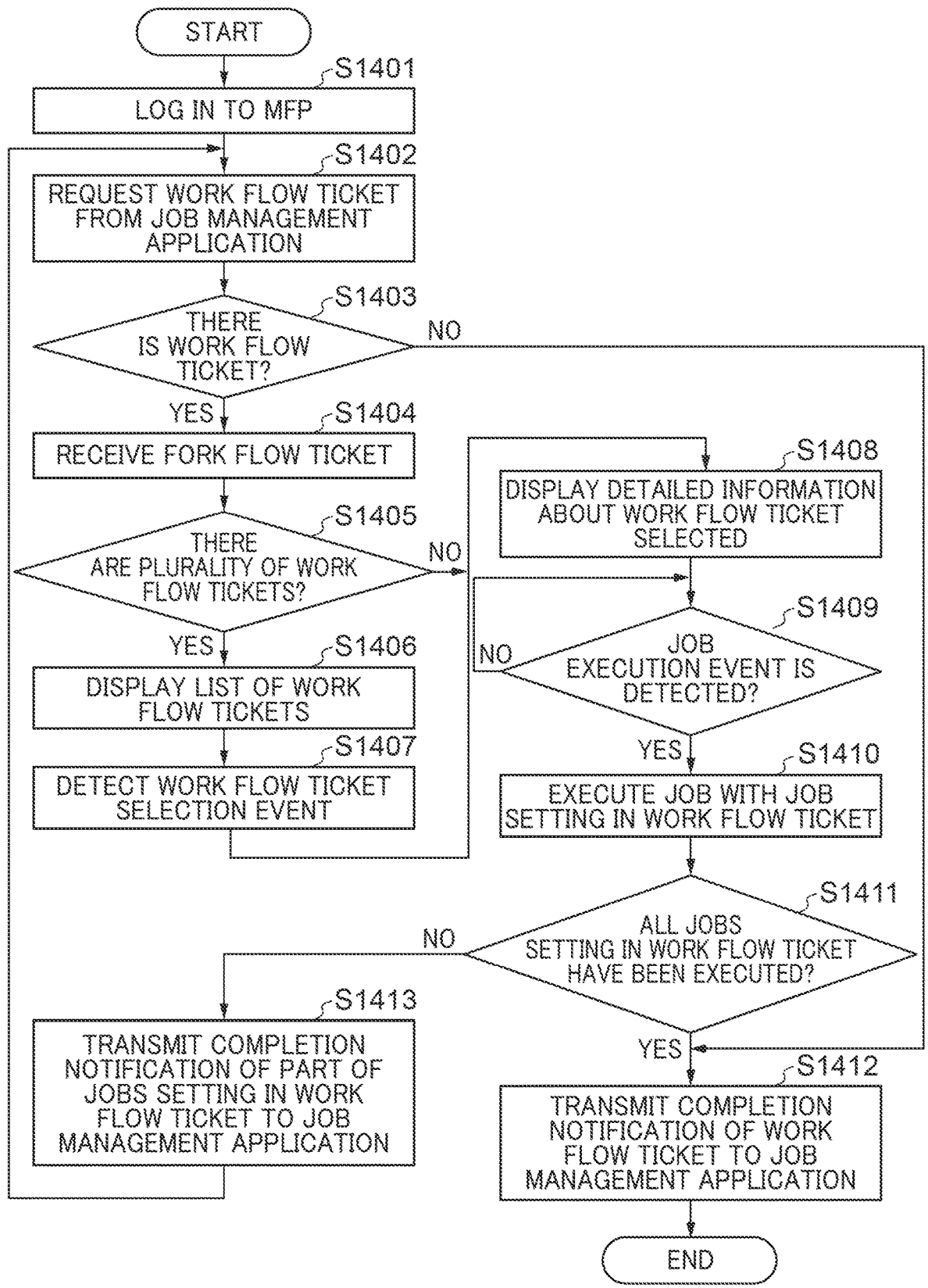
FIG. 14 is a flowchart showing a workflow ticket generation and transmission process according to the second embodiment.

FIG. 14 is a flowchart showing a workflow ticket reception and execution process according to this embodiment.

In this process, the job control application 520 running on the MFP 110 receives the workflow ticket from the job management application 700 running on the job management server 130 and executes the job. Each step shown in the flowchart in FIG. 14 is processed when the CPU 3020 develops the control program and the job control application 520 stored in the memory like the ROM 3030 onto the RAM 3040 and executes them. It should be noted that a step S1403 is processed by the CPU 601 developing the control program and the job management application 700 stored in the memory like the ROM 603 onto the RAM 603 and executing them.

When the CPU 3020 detects that a user logs in to the MFP 110 using the user authentication module 530 in a step S1401, the process proceeds to a step S1402

In the step S1402, the CPU 3020 activates the job control application 520 and requests the workflow ticket from the job management application 700. Specifically, the CPU 3020 obtains the user information from the login information input to the user authentication module 530 in the step S1401, and transmits the user information to the job management server 130 at the same time as the request.

In the step S1403, the CPU 601 determines whether the job setting management module 705 of the job management application 700 includes a workflow ticket that is associated with the user of the user information sent in the step S1402 and is not in the completion state described below. When it is determined that there is the workflow ticket (YES in the step S1403), the job setting transmission module 706 transmits the corresponding workflow ticket as a response, and the process proceeds to a step S1404. In this embodiment, a case where a plurality of workflow tickets are transmitted will be described below. In the meantime, when it is determined that there is no such a workflow ticket (NO in the step S1403), this process is terminated.

In a step S1404, the CPU 3020 receives the workflow ticket(s) transmitted in response to the request in the step S902 with the job reception module 522.

In a step S1405, the CPU 3020 determines whether there are a plurality of workflow tickets received in the step S1404. When there are the plurality of workflow tickets (YES in the step S1405), the process proceeds to a step S1406. When there is one workflow ticket (NO in the step S1405), the process proceeds to a step S1408.

In the step S1406, the CPU 3020 displays the job list screen 1500 (FIG. 15A) on the display unit 3090 by passing the received workflow tickets to the job display module 523.

The job list screen 1500 displays the job information of each workflow ticket received in the step S1404. At this time, as for the workflow ticket having a plurality of jobs, only the information about a job to be processed first is displayed on the job list screen 1500. For example, a top button 1501 on the job list screen 1500 indicates a workflow ticket having a job 1311 to be processed first and a job 1312 to be processed second that are registered using the job setting screen 1310 shown in FIG. 13B. With respect to such a button, only information about a job to be processed first (the information about the job 1311 for the button 1501) is displayed. As in the case of the button 1501, information such as a suffix ("_1" of the button 1501) indicating the order of the job in the workflow ticket may be added to the job name.

When the CPU 3020 detects that one of the pieces of job information displayed on the job list screen 1500 has been selected by the user in a step S1407, the process proceeds to the step S1408.

In the step S1408, the CPU 3020 displays the job detail screen 1520 (FIG. 15C) on the display unit 3090 by passing the job information that is detected to be selected in the step S1407 to the job display module 523.

The job detail screen 1520 displays details of the job information that is detected to be selected in the step S1407. It should be noted that the content displayed on the job detail screen 1520 may overlap the content displayed in the job list screen 1500. Thereafter, when the CPU 3020 detects that the job execution start button 1521 is pressed by the user (a job execution event) (YES in a step S1409), the process proceeds to a step S1410. It should be noted that the process may proceed to the step S1410 in displaying the job detail screen 1520 instead of press of the job execution start button 1521. In this case, the job detail screen 1520 does not include the job execution start button 1521 but includes only a job cancel button 1522, and the display of this screen is also terminated at the time when this process is terminated by the execution completion notification in a step S1412 described later. If the job cancel button 1522 is pressed before the end of this process, an interrupt process for forcibly terminating this process is executed.

The CPU 3020 determines in a step S1411 whether all the jobs setting in the workflow ticket have been executed. When all the jobs have been executed (YES in step S1411), the process proceeds to a step S1412.

In the meantime, when only a part of the jobs, i.e., only the job indicated on the job detail screen 1520, has been executed (NO in the step S1411), the process proceeds to a step S1413. In the step S1413, the CPU 3020 transmits the completion notification about the part of the jobs in the target workflow ticket to the job management server 130 with the job execution module 524, and then returns the process back to the step S1402. When the job execution result reception module 707 receives the completion notification about the part of the jobs in the workflow ticket, the CPU 601 of the job management server 130 updates the workflow ticket in the job setting management module 705 according to the result and then determines a job to be executed next. When the process in the step S1406 is executed again after returning back to the step S1402, the CPU 3020 displays a job list screen 1510 (FIG. 15B) on the display unit 3090 instead of the job list screen 1500 (FIG. 15A). At this time, as for the workflow ticket having a plurality of jobs, only the information about a job to be processed first is displayed on the job list screen 1510. For example, a top button 1511 on the job list screen 1510 indicates a workflow ticket having a job 1311 to be processed first and a job 1312 to be processed second that are registered using the job setting screen 1310 shown in FIG. 13B. With respect to such a button, when the processing of the first job is completed and the job to be currently processed is the second job, only job information about the job to be processed second (the information about the job 1312 for the button 1511 if the job 1311 has been executed) is displayed. As in the case of the button 1511, information such as a suffix ("_2" of the button 1511) indicating the order of the job in the workflow ticket may be added to the job name.

As described above, in this embodiment, the plurality of workflow tickets addressed to the login user who is the proxy executor are displayed in the job list screen on the display unit 3090 of the MFP 110. When the requester generates a workflow ticket combining a plurality of jobs, the job list screen displays only information about a job to be currently processed in the workflow ticket. This prevents confusion when the proxy executor executes a job from the requester and improves usability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-132615, filed Aug. 23, 2022, which is hereby incorporated by reference herein in its entirety.

What is claimed is:

1. An information processing apparatus included in an information processing system that further includes an image forming apparatus and an external server and enables proxy execution of a job to the image forming apparatus by a proxy executor based on a request from a requester, the information processing apparatus comprising:
    at least one memory and at least one processor and/or at least one circuit that function as:
    a first display control unit configured to perform control to display a first screen used for a chat between the requester and the proxy executor;
    a second display control unit configured to perform control to display a second screen for setting a job for the image forming apparatus in a case where the requester performs a first operation during display of the first screen; and
    a transmission control unit configured to perform control to transmit information indicating a setting performed on the second screen to the external server to control the external server to generate a setting information package of the job set on the second screen in a case where the requester performs a second operation during display of the second screen,
    wherein the proxy executor can be set based on an operation performed on the second screen, and
    wherein a notification showing that the proxy execution of the job using the setting information package is transmitted from the external server to the proxy executor in a case where information indicating the setting performed on the second screen includes information indicating that the proxy executor is set.

2. The information processing apparatus according to claim 1, wherein the image forming apparatus displays an instruction item in a case where the proxy executor logs in, and
    wherein the image forming apparatus executes the job based on a job setting included in the setting information package in a case where the instruction item is operated.

3. The information processing apparatus according to claim 1, wherein the image forming apparatus displays a screen showing the job setting included in the setting information package and executes the job based on the job setting included in the setting information package in a case where the proxy executor longs in.

4. The information processing apparatus according to claim 1, wherein the image forming apparatus obtains the setting information package from the external server and displays an instruction item for instructing to execute the job based on the job setting included in the setting information package in when the requester logs in a case where the information indicating that the proxy executor is set is not included in the information indicating the job setting transmitted by the transmission control unit, and
    wherein the image forming apparatus executes the job based on the job setting included in the setting information package in a case where the instruction item is operated.

5. The information processing apparatus according to claim 1, wherein an item for accepting an instruction to add a different job in addition to the job to the setting information package is displayed on the second screen.

6. The information processing apparatus according to claim 5, wherein the image forming apparatus displays the job setting included in the setting information package after the proxy executor logs in until the job is finished and displays a job setting of the different job included in the setting information package when the job is finished.

7. The information processing apparatus according to claim 1, wherein a group rather than an individual can be set as the proxy executor on the second screen.

8. The information processing apparatus according to claim 1, wherein the second display control unit controls to update the second screen so that a setting unavailable in the image forming apparatus will not be displayed in a case where the proxy executor is set on the second screen.

9. The information processing apparatus according to claim 1, wherein the image forming apparatus displays, in a case wherein there are a plurality of setting information packages of jobs to be executed by a user when the user logs in, a list of instruction items for instructing to execute the respective jobs based on the plurality of setting information packages.

10. The information processing apparatus according to claim 1, wherein the notification is transmitted from the external server to the proxy executor through the chat.

11. The information processing apparatus according to claim 10, wherein the external server transmits, when the notification is transmitted through the chat, the setting information package to the information processing apparatus of which a user is the proxy executor, and
    wherein the information processing apparatus transmits the setting information package transmitted from the external server to the image forming apparatus upon receiving the notification and the setting information package from the external server.

12. The information processing apparatus according to claim 1, wherein the image forming apparatus obtains the setting information package from the external server when the proxy executor logs in.

13. An information processing system that enables proxy execution of a job to an image forming apparatus by a proxy executor based on a request from a requester using an information processing apparatus, the information processing system comprising:
    the information processing apparatus comprising at least one memory and at least one processor and/or at least one circuit that function as:

a first display control unit configured to perform control to display a first screen used for a chat between the requester and the proxy executor;

a second display control unit configured to perform control to display a second screen for setting a job for the image forming apparatus in a case where the requester performs a first operation during display of the first screen; and a transmission control unit configured to transmit information indicating a setting performed on the second screen to an external server to control the external server to generate a setting information package of the job set on the second screen in a case where the requester performs a second operation during display of the second screen, wherein the proxy executor can be set based on an operation performed on the second screen, the external server comprising at least one memory and at least one processor and/or at least one circuit that function as:

a generation unit configured to generate the setting information package based on the job setting;

a management unit configured to manage the setting information package generated; and a notification transmission unit configured to transmit a notification showing that the proxy execution of the job using the setting information package is transmitted to the proxy executor in a case where information indicating the setting performed on the second screen includes information indicating that the proxy executor is set; and the image forming apparatus comprising at least one memory and at least one processor and/or at least one circuit that function as:

a job display control unit configured to perform control to display an instruction item for instructing execution of the job based on the setting information package when the proxy executor logs in; and a job execution unit configured to execute the job based on the job setting included in the setting information package when the instruction item is operated.

14. A control method for an information processing apparatus included in an information processing system that further includes an image forming apparatus and an external server and enables proxy execution of a job to the image forming apparatus by a proxy executor based on a request from a requester, the control method comprising:

displaying a first screen used for a chat between the requester and the proxy executor;

displaying a second screen for setting a job for the image forming apparatus in a case where the requester performs a first operation during display of the first screen; and transmitting information indicating a setting performed on the second screen to the external server to control the external server to generate a setting information package of the job set on the second screen in a case where the requester performs a second operation during display of the second screen, wherein the proxy executor can be set based on an operation performed on the second screen, and wherein a notification showing that the proxy execution of the job using the setting information package is transmitted from the external server to the proxy executor in a case where information indicating the setting performed on the second screen includes information indicating that the proxy executor is set.

15. A control method for an information processing system that enables proxy execution of a job to an image forming apparatus by a proxy executor based on a request from a requester using an information processing apparatus, the control method comprising:

displaying a first screen used for a chat between the requester and the proxy executor;

displaying a second screen for setting a job for the image forming apparatus in a case where the requester performs a first operation during display of the first screen; and transmitting information indicating a setting performed on the second screen to an external server to control the external server to generate a setting information package of the job set on the second screen in a case where the requester performs a second operation during display of the second screen, which are executed by the information processing apparatus, wherein the proxy executor can be set based on an operation performed on the second screen, generating the setting information package based on the job setting;

managing the setting information package generated; and transmitting a notification showing that the proxy execution of the job using the setting information package is transmitted to the proxy executor in a case where information indicating the setting performed on the second screen includes information indicating that the proxy executor is set, which are executed by the external server, displaying an instruction item for instructing execution of the job based on the setting information package when the proxy executor logs in; and executing the job based on the job setting included in the setting information package when the instruction item is operated, which are executed by the image forming apparatus.

16. A non-transitory computer-readable storage medium storing a control program causing a computer to execute a control method for an information processing apparatus included in an information processing system that further includes an image forming apparatus and an external server and enables proxy execution of a job to the image forming apparatus by a proxy executor based on a request from a requester, the control method comprising:

a first display control step of performing control to display a first screen used for a chat between the requester and the proxy executor;

a second display control step of performing control to display a second screen for setting a job for the image forming apparatus in a case where the requester performs a first operation during display of the first screen; and a transmission control step of transmitting information indicating a setting performed on the second screen to the external server to control the external server to generate a setting information package of the job set on the second screen in a case where the requester performs a second operation during display of the second screen, wherein the proxy executor can be set based on an operation performed on the second screen, and wherein a notification showing that the proxy execution of the job using the setting information package is transmitted from the external server to the proxy executor in a case where information indicating the setting performed on the second screen includes information indicating that the proxy executor is set.

17. A non-transitory computer-readable storage medium storing a control program causing a computer to execute a control method for an information processing system that enables proxy execution of a job to an image forming apparatus by a proxy executor based on a request from a requester using an information processing apparatus, the control method comprising:
- a first display control step of performing control to display a first screen used for a chat between the requester and the proxy executor;
- a second display control step of performing control to display a second screen for setting a job for the image forming apparatus in a case where the requester performs a first operation during display of the first screen; and
- a transmission control step of transmitting information indicating a setting performed on the second screen to an external server to control the external server to generate a setting information package of the job set on the second screen in a case where the requester performs a second operation during display of the second screen, which are executed by the information processing apparatus, wherein the proxy executor can be set based on an operation performed on the second screen,
- a generation step of generating the setting information package based on the job setting;
- a management step of managing the setting information package generated; and
- a notification transmission step of transmitting a notification showing that the proxy execution of the job using the setting information package is transmitted to the proxy executor in a case where information indicating the setting performed on the second screen includes information indicating that the proxy executor is set, which are executed by the external server,
- a job display control step of performing control to display an instruction item for instructing execution of the job based on the setting information package when the proxy executor logs in; and
- a job execution step of executing the job based on the job setting included in the setting information package when the instruction item is operated, which are executed by the image forming apparatus.

* * * * *